May 18, 1937.    E. L. ANDERSON    2,081,030
SUPPORTING MEANS
Filed April 18, 1936
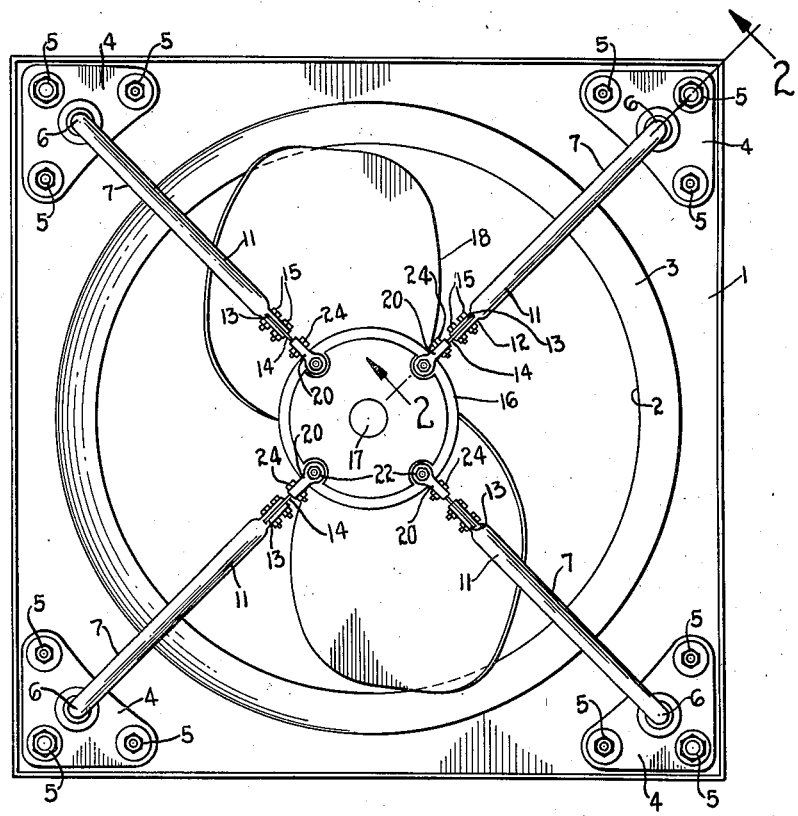
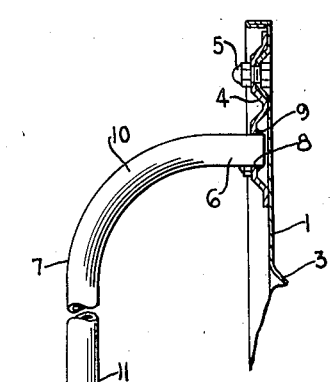
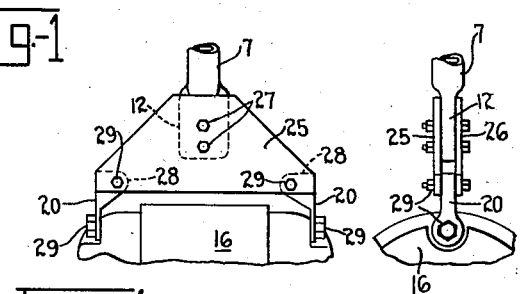
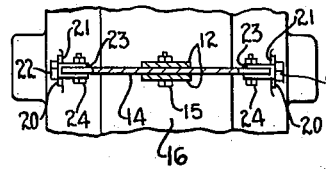
INVENTOR Patented May 18, 1937

2,081,030

UNITED STATES PATENT OFFICE 2,081,030

SUPPORTING MEANS

Edward L. Anderson, Grosse Isle, Mich., assignor to American Blower Corporation, Detroit, Mich., a corporation of Delaware Application April 18, 1936, Serial No. 75,070

6 Claims. (Cl. 248—26)

My invention relates to new and useful improvements in supporting means for fans, and more particularly to means for mounting the fan driving motor.

An object of my invention is to provide a mounting means which will eliminate the transmission of vibration and noise to the supporting structure.

Another object is to provide a mounting means which will hold a fan motor and its supported fan rigidly in position while permitting oscillatory movement of the motor casing about its shaft.

Another object is to provide a mounting means which is of simple and rugged construction.

The invention consists in the novel construction and combination of parts, to be more fully described hereinafter and the novelty of which will be particularly pointed out and distinctly claimed.

In the accompanying drawing, to be taken as a part of this specification, I have fully and clearly illustrated certain embodiments of my invention, in which drawing—

Figure 1 is a view in end elevation of a fan and its driving motor equipped with the mounting means of my invention;

Fig. 2 is an enlarged detail view on the line 2—2 of Fig. 1;

Fig. 3 is a detail view in section on the line 3—3 of Fig. 2;

Fig. 4 is a view similar to Fig. 2 but showing another form of my invention, and Fig. 5 is a view looking from right to left of Fig. 4.

Referring to the drawing by characters of reference, 1 designates the fan face plate of heavy gauge sheet metal and which may be rectangular in outline as shown. The plate 1 is provided with a central orifice 2 defined by an inwardly convex fan ring 3. Secured to the corner portions of the plate 1 so that they are equally spaced circumferentially of the orifice 2 are supporting plates 4 which are rigidly fixed and clamped to the inlet side of plate 1 by bolts 5. Each of these plates 4 receives and anchors to the plate 1 the outer end portions 6 of supporting arms 7. The end portions 6 preferably extend through apertures 8 in the plate 4 and are welded, as at 9, to the plates 4 so that the arms 7 are rigidly held against movement at their outer fixed ends. The arms 7 are preferably hollow or tubular rods which extend normal to the plate 1 at their end portions 6 and which are then bent or curved, as at 10, so that their inner end portions 11 lie in a common plane parallel to the plate 1. The arms 7 also extend radially of the orifice 2 and terminate in flattened end portions 12 which are bifurcated or provided with end slots 13. Positioned in each of the slots 13 there is a resilient sheet material plate 14 preferably of sheet metal and which is preferably substantially triangular, each having its apex extending into the end slot of its arm. The plates 14 extend transversely to the arms 7 and are rigidly secured in the slots 13 by nuts and bolts 15 which are passed through the flattened portions 12. Positioned concentrically with the orifice 2 and within the space defined by the inner ends of arms 7, there is a fan motor having a casing 16 and a driving shaft 17 on which the fan 18 is mounted. The plates 14 extend longitudinally of the motor casing 16 and also radially thereof, the base edges 19 of the plates 14 lying very close to the circumference of casing 16 and preferably being spaced therefrom only sufficiently to provide a working clearance. The plates 14 are preferably substantially coextensive in length with the length of the casing 16 so that there will be a substantial plate area radially of the casing and laterally of the arms 7 for increasing the strength of the plates and for facilitating the joining of the casing to the supporting arms. The opposite ends of the plates 14 are secured to the opposite ends of the motor casing by clamping members 20 which are preferably in the form of angle brackets, each having an arm 21 bolted, as at 22, to the motor casing. The other arm 23 of each bracket is preferably bifurcated or slotted to provide a yoke receiving an end of a plate 14. The ends of the plates 14 are tightly secured to the bracket arms 23 by bolts or the like 24.

The construction in Figs. 4 and 5 is substantially like that above described but a pair of parallel plates 25, 26 is employed for securing each of the arms 7 to the motor casing. The flattened end portion 12 is not slotted but extends between the plates 25, 26 and serves to space them from each other. The plates 25, 26 are secured to the arms 7 by nuts and bolts 27. In this form the brackets or clamping members 20 likewise do not have a bifurcated arm and extend between the end portions of each of the pairs of plates. The plates 25, 26 are tightly secured or clamped to the opposite faces of the bracket arms 28 by nuts and bolts 29.

From the foregoing description it will be apparent that the motor and fan will be held rigidly against movement longitudinally of the motor shaft and also that the casing is fixed against lateral or radial movement. Oscillatory movement of the motor casing on starting and stopping of the fan and also during its operation will be taken up by the plates 14. The vibration of the motor which is taken up by plates 14 will not have any substantial transmission to the plate 1 by reason of the mass of the arms 7 and the fact that the arms 7 are rigidly anchored to the plate 1. Any transmission of vibration from the motor is also eliminated by positioning the plates 14 closely adjacent the motor casing and by reducing to a minimum the radial length of the plates between the ends of arms 7 to which the plates are secured and the motor casing. By providing four equally spaced supporting arms 7, the casing 16 is held against endwise twisting or tilting. The form shown in Figs. 4 and 5 permits the use of lighter gauge plates while retaining the strength and rigidity of the mounting.

What I claim and desire to secure by Letters Patent of the United States is:

1. A fan motor mounting comprising a motor casing, a plurality of rigidly mounted rigid supporting arms extending radially of said casing, said arms terminating at their inner ends closely adjacent said casing, a resilient sheet material plate for each arm, each plate being rigidly secured to the inner end of its arm and extending longitudinally and radially of said casing, and means securing said plates to said casing and against radial or longitudinal movement relative to said casing.

2. A fan motor mounting comprising a motor casing, a plurality of rigidly mounted rigid supporting arms extending radially of said casing, said arms terminating at their inner ends closely adjacent said casing, a resilient sheet material plate for each arm, each plate being rigidly secured intermediate its ends to the inner end of its arm and extending longitudinally and radially of said casing, and means securing the end portions of each of said plates to said casing and against radial or longitudinal movement relative to said casing.

3. A fan motor mounting comprising a motor casing, a plurality of elongated tubular rigid supporting arms extending radially of said casing, means holding said arms at their outer ends against movement, said arms terminating at their inner ends closely adjacent said casing, a sheet metal plate for each arm, each plate being rigidly fixed to and extending transversely of its arm, said plates extending longitudinally and radially of said casing, clamping members secured one to each end of each of said plates, and means securing said clamping members to the ends of said casing.

4. A fan motor mounting comprising a motor casing, a plurality of elongated tubular rigid supporting arms extending radially of said casing, means holding said arms at their outer ends against movement, each arm terminating at its inner end in a flattened end portion closely adjacent said casing, a sheet metal plate for each arm, each plate being rigidly fixed to and extending transversely of the flattened end portion of its arm, said plates extending longitudinally and radially of said casing, clamping members secured one to each end of each of said plates, and means securing said clamping members to the ends of said casing.

5. A fan motor mounting comprising a motor casing, a plurality of elongated tubular rigid supporting arms held at their outer ends against movement and extending radially of said casing, the inner end of each of said arms terminating closely adjacent said casing and having an end slot extending longitudinally of said casing, a resilient metal plate for each arm, each plate extending transversely to its arm and rigidly fixed in its arm slot, and a pair of clamping members for each plate and secured to said casing, one of said clamping members being secured to each end of each of said plates.

6. A fan motor mounting comprising a motor casing, a plurality of elongated rigid supporting arms extending radially of said casing, means holding said arms at their outer ends against movement, said arms terminating at their inner ends closely adjacent said casing, a pair of sheet metal plates for each arm, each pair of plates embracing and being rigidly fixed to the opposite inner end and extending transversely of its arm, clamping members secured to the opposite ends of said motor casing and extending between the adjacent plates of each pair at the end portions of said plates, and means securing said plates to their clamping members.

EDWARD L. ANDERSON.